United States Patent [19]

Toffolon

[11] Patent Number: 4,522,091
[45] Date of Patent: Jun. 11, 1985

[54] BAR PULLER

[75] Inventor: Joseph F. Toffolon, Southington, Conn.

[73] Assignee: Progressive Machinery Sales, Inc., Southington, Conn.

[21] Appl. No.: 568,378

[22] Filed: Jan. 5, 1984

[51] Int. Cl.$^3$ .................. B23B 25/00; B23B 13/12
[52] U.S. Cl. .................................. 82/38 R; 82/2.5; 279/1 ME; 414/14
[58] Field of Search ............... 82/2.5, 38 R; 29/57; 279/1 ME, 41 A, 46 A; 414/14, 17

[56] References Cited

U.S. PATENT DOCUMENTS

| | | | |
|---|---|---|---|
| 490,863 | 1/1893 | Conradson | 414/14 |
| 932,394 | 8/1909 | Johnson | 414/14 |
| 4,321,845 | 3/1982 | Szabo et al. | 82/2.5 |

FOREIGN PATENT DOCUMENTS 11600 of 1892 United Kingdom ................. 414/14

Primary Examiner—Leonidas Vlachos
Attorney, Agent, or Firm—McCormick, Paulding & Huber

[57] ABSTRACT

A bar puller mounted at a tool station on the turret of a numerically controlled turret lathe has opposing reversible, self-centering jaws biased toward each other and to a centered position for general alignment with the projecting end portion of a bar held by a rotary chuck mechanism, which comprises part of the lathe. The jaws receive and grip the projecting end portion of the bar therebetween when the bar puller is forced into engagement with the projecting end of the bar by movement of the turret. The bar puller may be adapted for mounting at either a boring or turning tool station on the turret. The jaws are adjustably positionable to receive and grip bars of differing size.

19 Claims, 7 Drawing Figures

BAR PULLER

BACKGROUND OF THE INVENTION

This invention relates in general to feed attachments for machine tools and deals more particularly with an improved bar puller for a numerically controller turret lathe or the like. In a machine of the aforedescribed general type, a plurality of tools mounted at angularly spaced tool stations on a rotary turret are sequentially indexed into working position to perform a series of turning and/or boring operations on a piece of bar stock held by a rotating chuck in response to command signals received by the machine from a programmable controller. Upon completion of a workpiece, a cut-off tool mounted at one of the tool stations moves into cutting engagement with the bar to sever the finished workpiece from the bar leaving an end portion of the bar projecting from the chuck. Thereafter, a bar puller, mounted on the turret at one of the work stations, is moved by the turret into gripping engagement with the projecting end of the bar. The chuck is then released, in accordance with a predetermined program, and the turret backs away from the chuck pulling a length of bar stock into working position in preparation for the next machine cycle.

One type of bar puller adapted for attachment to a turret includes mechanism for closing and opening jaws to grip and release a bar. Although bar pullers of the latter type are generally satisfactory for most purposes, such bar pullers are quite expensive to manufacture, install and maintain. Another type of bar puller presently in use has a resilient generally C-shaped frame which includes a pair of integral, spaced apart jaw holders. A pair of jaw pads mounted in spaced relation to each other on the jaw holders have opposing jaw surfaces for gripping a bar. The spacing between the jaw surfaces is somewhat less than the width of the bar with which the bar puller is to be used to allow for forceable insertion of the bar between the jaws. The jaws are biased into holding position by the resilient jaw holders to grip the bar. Such a bar puller may be adapted to receive a plurality of different bars in a limited range of sizes by changing jaw pads and/or inserting shims between the jaw pads and the jaw holders to vary the spacing between the jaw surfaces. The hardened jaw pads used with such bar pullers are relatively expensive. Several sets of pads may be required to adapt such a bar puller to accommodate even a limited range of bar sizes. If a significant difference exists between the sizes of bars to be processed on the machine, several such bar pullers of varying size may be required, which adds substantially to the cost of tooling.

It is the general aim of the present invention to provide an improved bar puller which does not require an operating mechanism for opening and closing its jaws and which may be readily adjusted to accommodate bars in a wide range of sizes.

DETAILED DESCRIPTION OF PREFERRED EMBODIMENT

Figure 1:
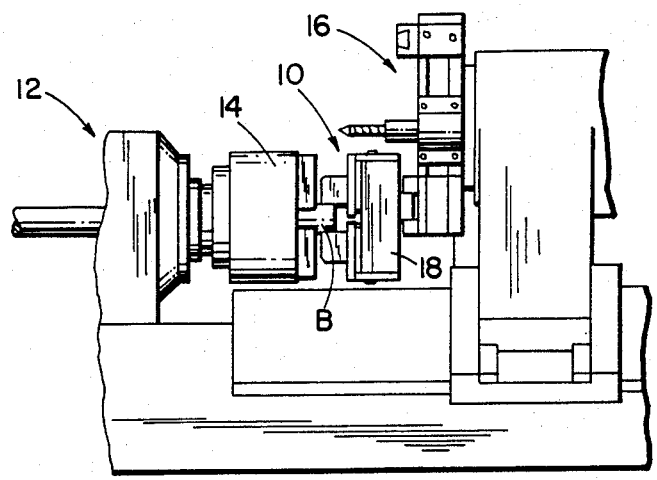
FIG. 1 is a fragmentary side elevational view of a numerically controlled turret lathe with a bar puller embodying the present invention.

Turning now to the drawings, a bar puller embodying the present invention and indicated generally by the reference numeral 10 is shown in FIG. 1 attached to a numerically controlled turret lathe indicated generally by the numeral 12. The machine 12, which may, for example, comprise a MORI SEIKI SL-4 CNC Lathe, has a turning center or chuck mechanism 14 for gripping and rotating a bar B, and a rotary turret indicated generally at 16 which carries a plurality of angularly spaced tools for performing boring and/or turning operations on the bar B to form an end portion of the bar into a workpiece and for severing the finished workpiece from the bar upon completion of the machine operating cycle, leaving an end portion of the bar projecting from the chuck mechanism 14. The bar puller 10 is mounted at one of the tool stations on the turret 16 and moved by the turret into gripping engagement with the projecting end portion of the bar B. When the chuck mechanism is released and the turret backed away from the chuck mechanism a portion of the bar will be advanced or pulled in the direction of the turret and into the working region of the turret by the bar puller 10 in preparation for the next working cycle of the machine 12.

The bar puller 10 essentially comprises a housing 18, a shank 19 secured to the housing by fasteners (not shown) and adapted for attachment to the turret at one of the turret work stations, and jaw assemblies which include jaw holders, indicated generally at 20, 20, supported on the housing 18 for movement generally toward and away from each other. The jaw assemblies further include jaws, indicated generally at 22, 22, mounted on the jaw holders 20, 20 and define opposing jaw surfaces 24, 24 for gripping a bar, such as the bar B. The jaw holders are normally biased toward each other and into engagement with a jaw centering element 26, shown in FIG. 3, mounted on the housing 18. The jaw centering element maintains a predetermined relationship between the jaws 22, 22 and the shank 19 as well as a proper spacing between the jaw surfaces 24, 24 to receive a bar, such as the bar B, when the bar is forceably inserted therebetween, as will be hereinafter further discussed.

The shape of the housing may vary, but preferably and as shown the housing 18 comprises an elongated generally rectangular block which has a channel 27 extending longitudinally through it and opening through its front and end faces. The shank 19 has a generally rectangular cross-section and is fastened at one end to the rear face of the housing 18 and projects laterally outwardly for some distance beyond the housing. The centering element 26 preferably comprises a cylindrical dowel pin which is pressed into the housing 18 and extends into the central portion of the channel 27. As shown, the axis of the pin 26 lies within the plane of one of the surfaces of the shank 19.

Figure 3:
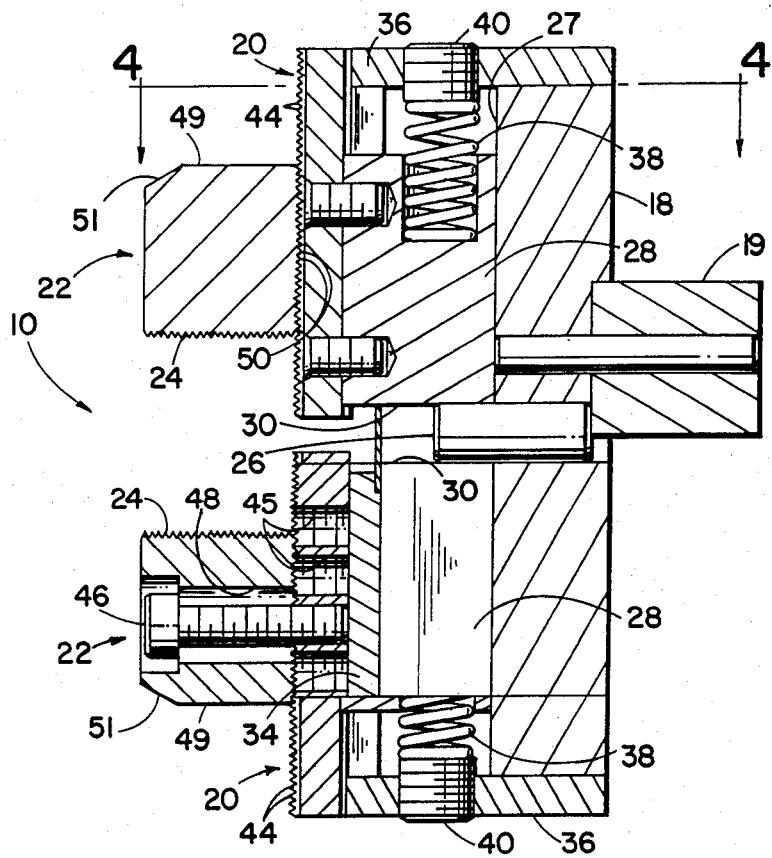
FIG. 3 is a sectional view taken generally along the line 3—3 of FIG. 2.
Figure 5:
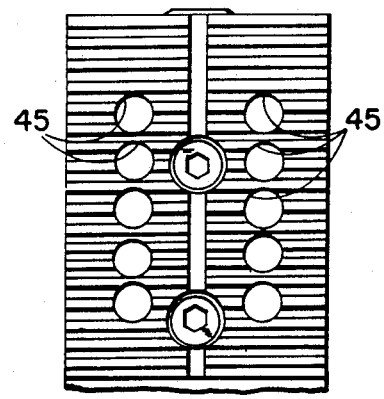
FIG. 5 is a fragmentary front view of an upper portion of the bar puller as shown in FIG. 3, but with its upper jaw removed.
Figure 4:
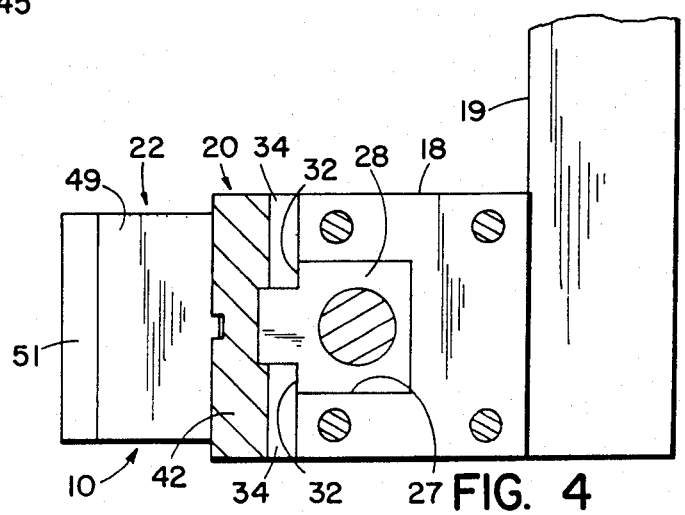
FIG. 4 is a sectional view taken along the line 4—4 of FIG. 3.

The jaw holders 20, 20 include generally rectangular slide blocks or jaw slides 28, 28 which are received within and generally complement the channel 27. The jaw slides 28, 28 are positioned in opposite ends of the channel 27 and at opposite sides of the centering element 26. The inner end of each slide block 28 defines an inwardly facing abutment surface 30 for engaging an associated outwardly facing abutment surface on the centering element 26. Each jaw slide 28 has relieved its longitudinally extending marginal portions which define forwardly facing slide surfaces 32, 32, best shown in FIG. 4. Transversely spaced apart guide members 34, 34, secured to the frontal surfaces of the housing, engage the slide surfaces 32, 32 to retain the jaw slides 28, 28 within the channel 27 for longitudinal sliding movement generally toward and away from each other. A thin plate located between the guide members 34, 34 and clamped to the housing 18 by the guide members provides a closure for the channel 27 forward of the centering pin 26, as best shown in FIG. 3. The ends of the channel 27 are closed by end plates 36, 36 fastened to opposite ends of the housing. A biasing spring 38 acts between each end plate 36 and an associated jaw slide 28 to bias the jaw slide inwardly and toward engagement with the jaw centering pin 26. Adjustment screws 40, 40 threaded into the end plates 36, 36 engage the outer ends of the biasing springs 38, 38 for adjusting the biasing force exerted by each spring on its associated jaw slide 28.

A jaw plate 42, which also comprises part of each jaw holder, is fastened to the front face of each jaw slide 28 to travel with it and relative to the housing 18. Each jaw plate 42 has a uniformly spaced longitudinal series of transversely extending saw tooth serrations 44, 44 formed in its face. In the presently preferred embodiment, a 1/16 inch longitudinal spacing is provided between adjacent serrations. A longitudinally spaced series of sets of jaw fastener openings are formed in each jaw plate. Each set of openings includes two transversely spaced apart threaded openings 45, 45 to receive fasteners 46, 46 for securing an associated jaw 22 to the jaw plate.

Figure 2:
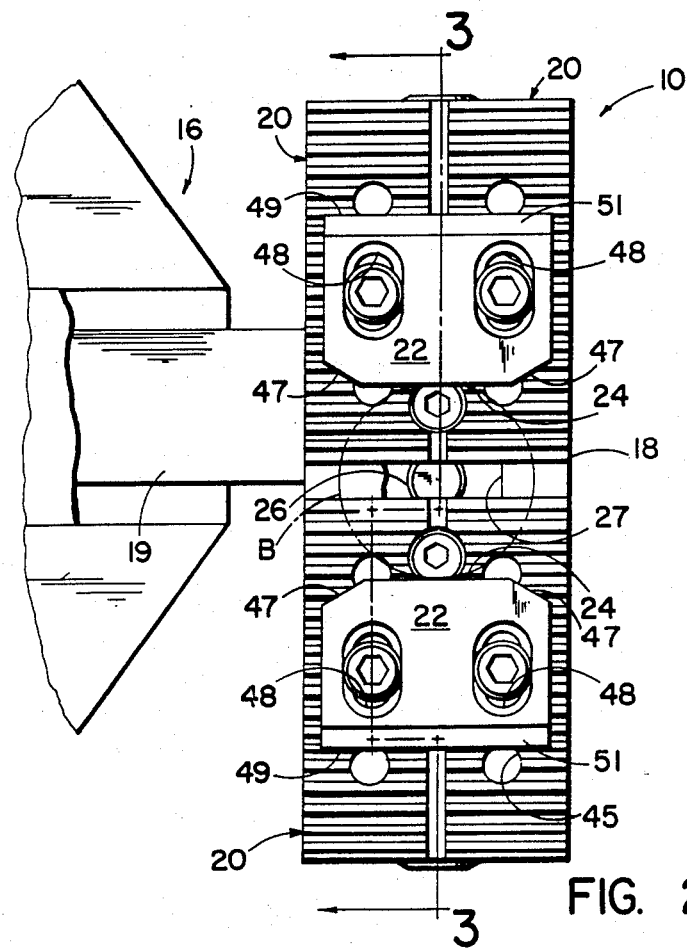
FIG. 2 is a somewhat enlarged fragmentary front view of the bar puller of FIG. 1, shown mounted at a work station on the turret of the machine.

Preferably, and as shown, the jaws 22, 22 are reversible and have roughened or serrated jaw surfaces 24, 24 and lead surfaces 47, 47 which form 25 degree lead angles with the surfaces 24, 24, as shown in FIG. 2. Each jaw 22 also has a smooth jaw surface 49 and a lead surface 51 which forms a lead, angle of approximately 30 degrees with the smooth surface 49. A pair of longitudinally extending slots 48, 48 formed in each jaw 22 receive fasteners 46, 46 therethrough. Transversely extending saw tooth serrations 50, 50, formed in the rear surface of each jaw 22 substantially complement the saw tooth serrations 44, 44 on the face of an associated jaw plate 42.

Each jaw 22 may be mounted in any one of a plurality of positions by securing the associated fasteners 46, 46 in a selected set of fastener openings 45, 45. Thus, the general spacing between the jaw gripping surfaces 24, 24 may be adjusted by selectively securing the jaws 22, 22 in desired position on the jaw plates 42, 42. The slots 48, 48 permit finer adjustment of the jaws relative to each other. In the presently preferred embodiment of the invention each jaw may be adjusted toward or away from the other jaw in 1/16 inch increments within the limits of travel imposed by the slots 48, 48 by selectively engaging opposing associated saw tooth serrations 50, 50 and 44, 44 on the jaw and the jaw plate. This adjustment arrangement enables the bar puller 10 to accommodate bars in a wide range of sizes.

The bar puller 10 set-up as shown, is particularly adapted for mounting at a turning tool station on the turret 16 to pull relatively large bar stock, that is ½ inch bar stock, or larger. Preparatory to using the bar puller 10, the jaw opening is adjusted so that the spacing between the opposing jaw surfaces 24, 24 is ⅛ inch smaller than the width dimension of the bar to be processed. The gripping force applied by the jaws may be adjusted by rotating the adjustment screws 40, 40 in ½ turn increments until desired gripping force is attained. After a workpiece is completed, a cut-off tool mounted on the turret (but not shown) severs the workpiece from the bar B held by the rotating chuck mechanism, after which the bar stock is advanced in preparation for the next series of turning and boring operations. In preparation for the bar pulling operation, the turret 16 moves in the general direction of the chuck mechanism 14 to bring the jaw opening between the jaws into general lateral alignment with an end portion of the bar B projecting from the chuck mechanism 14. The turret 16 is now moved laterally and toward the projecting end of the bar to bring the jaws 22, 22 into engagement with the bar and forceably engage the bar puller with the projecting end of the bar. As the bar engages the leading surfaces 47, 47 on the sides of the jaws 22, 22, the jaws are forced apart allowing the projecting end portion of the bar B to enter the space therebetween. The saw tooth gripping surfaces 24, 24 on the opposing jaws grip and hold the bar. The chuck mechanism 14 now releases in response to a signal from the controller (not shown) and the turret 16 backs away from the chuck mechanism and to a predetermined position, as determined by the program, to advance the bar B in preparation for the next machining operation. The turret 16 now moves laterally away from the bar B in accordance with the predetermined program to move the jaws 22, 22 out of engagement with the bar B, after which the turret indexes and moves to position to bring the first of a series of boring and/or turning tools into working position relative to the bar.

Figure 6:
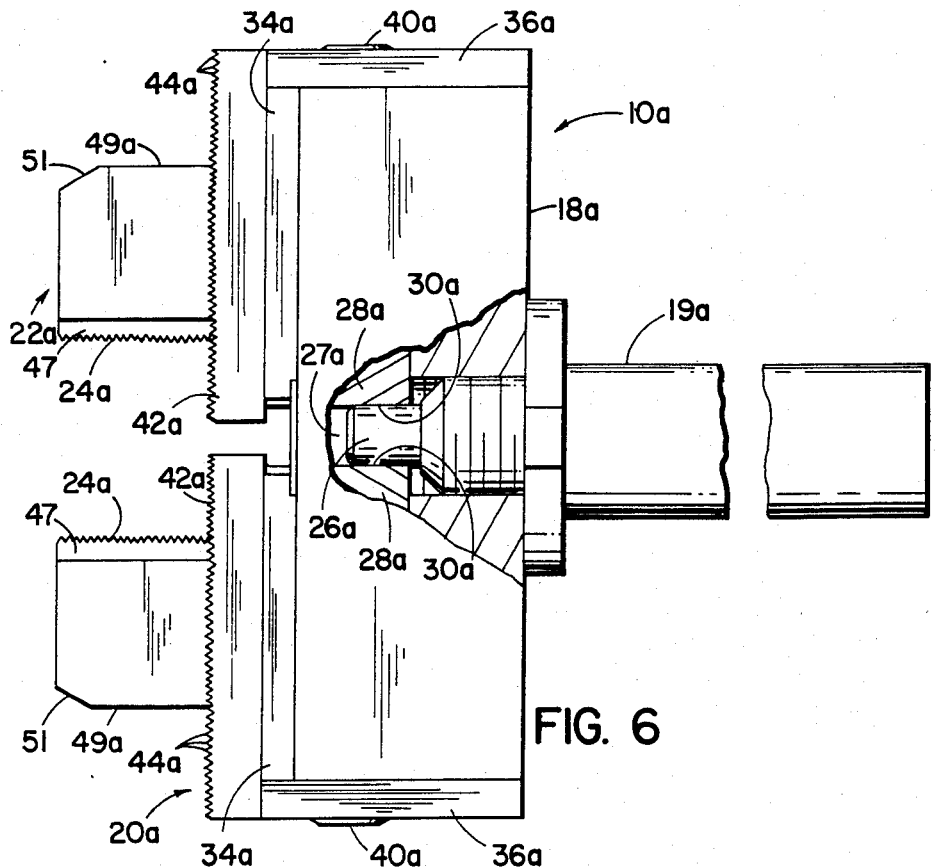
FIG. 6 is a side elevational view of another bar puller embodying the invention shown with a portion of its housing broken away to reveal structure therebehind.

Turning now to FIG. 6, another bar puller embodying the present invention is indicated generally at 10a. The bar puller 10a is similar in most respects to the bar puller 10, previously described, and parts identical to previously described parts bear the same reference numeral and a letter "a" suffix and will not be hereinafter further described. The bar puller 10a differs from the bar puller 10 in that it is particularly adapted for mounting at a turning tool station on the turret of a machine, such as the machine 12, and for this reason it has a different type of mounting shank. Specifically, the bar puller 10a has a cylindrical shank 19a which is threaded into and through an opening in the rear wall of the bar puller housing 18a. The shank 19a projects rearwardly from the bar puller housing 18a and has a coaxially aligned cylindrical portion of somewhat reduced diameter at its forward end which projects into the channel 27a and defines a jaw centering element 26a. The jaw centering element cooperates with abutment surfaces 30a, 30a, the inner ends of the jaw slides 28a, 28a to maintain the jaws in a proper position of alignment to receive an end of a bar therebetween, when the jaw puller 10a is properly mounted at a turning station on the turret of a numerically controlled lathe or the like.

Figure 7:
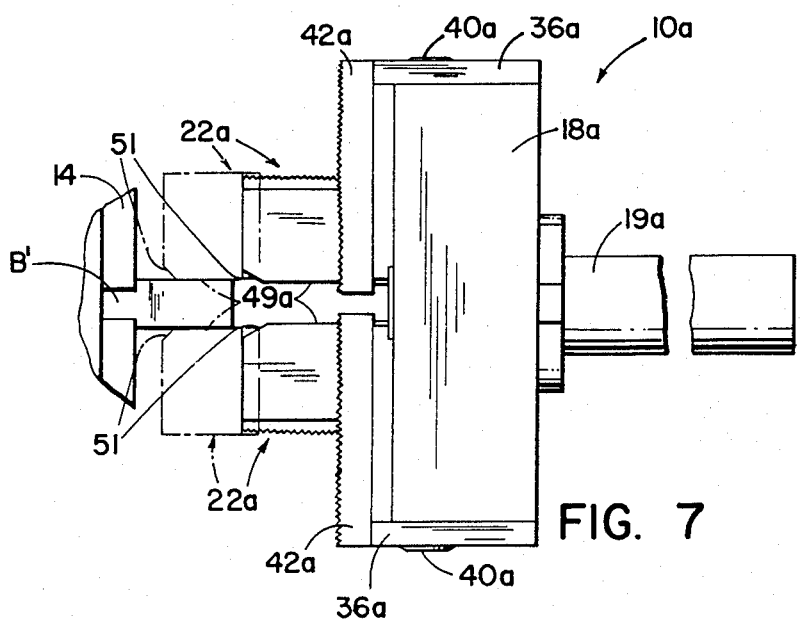
FIG. 7 is a somewhat reduced side elevational view of the bar puller of FIG. 6 shown set-up to pull a bar of small width.

The manner in which the bar puller of the present invention is used to feed a large bar, that is, a bar greater than ½ inch in width or diameter, has been hereinbefore generally described with reference to the bar puller 10. However, the bar puller is used in a somewhat different manner to feed a small bar, that is, a bar equal to or less than ½ inch in diameter or width. Referring now to FIG. 7, the bar puller 10a is shown setup to pull a small bar B'. Preparatory to pulling such a bar, the positions of the jaws are reversed, so that the smooth jaw surfaces 49a, 49a are arranged in opposing relation to each other to grip the bar B' therebetween. The lathe 12 is programmed so that its turret (not shown) moves the bar puller 10a to a position wherein the jaws 22a, 22a are centered in coaxial alignment with the axis of the bar B'. The turret then moves toward the chuck mechanism 14 in response to the predetermined machine program to forceably engage the bar puller with the projecting end of the bar B' held by the chuck mechanism 14. Lead surface 51, 51 on the forward ends of the jaws engage the bar, lead it into the jaws and cause the jaws to separate against the biasing force of the respective jaw springs (not shown) whereby the end portion of the bar is gripped between the smooth jaw surfaces 49a, 49a. The chuck mechanism 14 is then released and the turret backed away from the chuck mechanism to pull a length of bar from the chuck mechanism. When the bar is properly positioned, the chuck mechanism closes to grip the bar. Thereafter, the bar puller is moved out of gripping engagement with the bar by indexing the turret or backing it away from the bar, in accordance with the machine program.

The gripping force applied to the bar by the smooth jaws may be varied by turning the adjustment screws 40a, 40a. Thus, the gripping force may be adjusted to assure proper operation of the bar puller without marring the surface of the bar.

I claim:

1. A bar puller for a lathe having a turret including a plurality of tool stations, said bar puller comprising a housing defining a forwardly open channel, a pair of jaw assemblies supported on said housing for movement relative to said housing and to each other and including a pair of slide blocks slidably supported in said channel and having abutment surfaces on the inner ends thereof and a pair of jaws defining jaw surfaces for gripping engagement with an associated end portion of a bar supported for rotation by the lathe, each of said jaws being mounted on and projecting forwardly from an associated one of said slide blocks, a jaw centering element mounted in fixed position on said housing and disposed within said channel between said abutment surfaces, means for biasing said jaw assemblies to a bar receiving position wherein said abutment surfaces are disposed in abutting engagement with said jaw centering element and said jaw surfaces are disposed in spaced apart relation to each other to receive and grip an end portion of a bar forceably inserted between said jaws, and means for mounting said bar puller at one of the tool stations.

2. A bar puller for a lathe as set forth in claim 1 wherein said jaw centering element comprises a part of said mounting means.

3. A bar puller for a lathe as set forth in claim 2 wherein said mounting means comprises a shank projecting rearwardly from said housing and said jaw centering element comprises a forwardly projecting portion of said shank.

4. A bar puller for a lathe as set forth in claim 1 wherein said jaw centering element comprises a pin mounted in fixed position on said housing.

5. A bar puller for a lathe as set forth in claim 4 wherein said mounting means comprises a cylindrical shank projecting rearwardly from said housing and said pin is defined by a forwardly projecting portion of said shank.

6. A bar puller for a lathe as set forth in claim 4 wherein said mounting means comprises a shank attached to and projecting laterally from said housing.

7. A bar puller for a lathe as set forth in claim 1 including means for adjusting the biasing force applied by said biasing means to said jaw assemblies.

8. A bar puller for a lathe as set forth in claim 1 wherein said biasing means comprises a plurality of springs, each of said springs acting between said housing and the outer end of an associated one of said jaw assemblies.

9. A bar puller for a lathe as set forth in claim 8 wherein said bar puller includes a plurality of adjusting screws threadably engaged with said housing, each of said adjusting screws engaging the outer end of an associated one of said springs for varying the biasing force applied to an associated one of said jaw assemblies by said one spring.

10. A bar puller for a lathe as set forth in claim 1 wherein said jaw assemblies include jaw holders and said jaw means comprise jaws releasably secured to said jaw holders.

11. A bar puller for a lathe as set forth in claim 10 wherein each of said jaws defines a smooth jaw surface and a roughened jaw surface and said bar puller includes means for mounting each of said jaws in a plurality of positions on an associated jaw holder to selectively expose said smooth jaw surfaces and said roughened jaw surfaces for gripping engagement with an associated end portion of a bar.

12. A bar puller for a lathe as set forth in claim 10 including means for incrementally adjusting the position of said jaws relative to said jaw holders to vary the spacing between said jaw surfaces when said jaw assemblies are in said bar receiving position.

13. A bar puller for a lathe having a turret including a plurality of tool stations, said bar puller comprising a housing having a forwardly opening channel, shank means attached to said housing for mounting said bar puller at one of the tool stations, a pair of jaw assemblies slidably supported in said channel and including a pair of jaws having opposing jaw surfaces exposed forward of said channel for gripping an associated end portion of a bar, a rigid jaw centering element mounted in fixed position on said housing and disposed within said channel between said jaw assemblies, said jaw assemblies having opposing abutment surfaces thereon, and means for biasing said jaw assemblies toward each other and to a bar receiving position wherein said abutment surfaces are disposed in abutting engagement with said rigid jaw centering element and said jaw surfaces are disposed in spaced apart relation to each other to receive and grip a portion of a bar forcibly inserted into said jaws between said opposing jaw surfaces.

14. A bar puller for a lathe having a turret including a plurality of tool stations, said bar puller including an elongated housing having a forwardly open channel extending longitudinally therethrough, end plates secured to the opposite ends of said housing and providing closures for the opposite ends of said channel, a pair of slide blocks slidably supported in said channel and defining opposing inwardly facing abutment surfaces, a pair of jaws, means for releasably securing each of said jaws to an associated one of said slide blocks, said jaws defining opposing jaw surfaces, a jaw centering element mounted in fixed position on said housing and extending into the central portion of said channel, a pair of biasing springs disposed within said channel, each of said biasing springs acting between an associated end plate and an associated one of said slide blocks, said biasing springs urging said slide blocks to a bar receiving position wherein said abutment surfaces engage said jaw centering element and said opposing jaw surfaces are disposed in spaced apart relation to each other to receive and grip a bar forceably inserted into said jaws between said opposing jaw surfaces, and shank means attached to said housing and projecting therefrom for mounting said bar puller at one of the tool stations.

15. A bar puller for a lathe as set forth in claim 14 wherein said centering element comprises a part of said shank means.

16. A bar puller for a lathe as set forth in claim 15 wherein said shank means comprises a cylindrical shank projecting from the rear of said housing and said jaw centering element comprises a forward end portion of said shank.

17. A bar puller for a lathe as set forth in claim 16 including means for adjusting the biasing force exerted upon said slide blocks by said biasing springs.

18. A bar puller for a lathe as set forth in claim 17 wherein said adjusting means comprises a pair of adjustment screws, each of said screws threadably engaged with an associated one of said end plates and engaged with the outer end of an associated one of said springs.

19. A bar puller for a lathe as set forth in claim 14 wherein each of said jaws has a smooth jaw surface on one end and a roughened jaw surface on its opposite end and said jaws are reversibly positionable relative to said slide blocks.

* * * * *